(12) United States Patent
Pederson

(10) Patent No.: US 6,367,949 B1
(45) Date of Patent: Apr. 9, 2002

(54) PAR 36 LED UTILITY LAMP

(75) Inventor: John C. Pederson, St. Cloud, MN (US)

(73) Assignee: 911 Emergency Products, Inc., St. Cloud, MN (US)

(*) Notice: Subject to any disclaimer, the term of this patent is extended or adjusted under 35 U.S.C. 154(b) by 0 days.

(21) Appl. No.: 09/410,479

(22) Filed: Sep. 30, 1999

Related U.S. Application Data

(60) Provisional application No. 60/147,240, filed on Aug. 4, 1999.

(51) Int. Cl.[7] .............................................. F21V 29/00
(52) U.S. Cl. ........................ 362/240; 362/247; 362/373; 362/800
(58) Field of Search ................................ 362/237, 240, 362/241, 243, 247, 294, 373, 800, 249, 297, 346

(56) References Cited

U.S. PATENT DOCUMENTS

| | | |
|---|---|---|
| 3,701,043 A | 10/1972 | Suleeg et al. |
| 3,863,075 A | 1/1975 | Ironmonger et al. |
| 3,889,147 A | 6/1975 | Groves |
| 4,149,111 A | 4/1979 | Coates, Jr. |
| 4,243,985 A | 1/1981 | Quayle |
| 4,298,806 A | 11/1981 | Herold ................. 250/504 |
| 4,301,461 A | 11/1981 | Asano |
| 4,319,306 A | 3/1982 | Stanuch |
| 4,342,944 A | 8/1982 | SpringThorpe |
| 4,390,931 A | 6/1983 | Gorick et al. |
| 4,598,198 A | 7/1986 | Fayfield |
| 4,615,131 A | 10/1986 | Wakatake |
| 4,630,180 A | 12/1986 | Muraki et al. |
| 4,630,183 A | 12/1986 | Fujita |
| 4,633,280 A | 12/1986 | Takasu |
| 4,654,629 A | 3/1987 | Bezos et al. |
| 4,703,219 A | 10/1987 | Mesquida |
| 4,716,296 A | 12/1987 | Bussiere et al. ........... 250/504 |
| 4,720,835 A | 1/1988 | Akiba et al. |

(List continued on next page.)

FOREIGN PATENT DOCUMENTS

| | | |
|---|---|---|
| DE | 43 04 216 A1 | 2/1993 |
| DE | 297 12 281 | 5/1997 |
| EP | 0 468 822 A2 | 7/1991 |
| EP | 0 531 184 A1 | 8/1992 |
| EP | 0 531 185 A1 | 8/1992 |
| EP | 0 596 782 A1 | 10/1993 |
| EP | 0 633 163 A1 | 7/1994 |
| EP | 0 709 818 A1 | 5/1996 |
| EP | 0 896 898 A2 | 7/1998 |
| FR | 2 658 024 | 2/1990 |
| FR | 2 680 861 | 9/1991 |
| FR | 2 707 222 | 7/1993 |
| GB | 2 069 657 A | 8/1981 |
| GB | 2 175 428 A | 11/1986 |
| GB | 2 240 650 A | 8/1991 |
| GB | 2 272 791 A | 5/1994 |
| GB | 2 292 450 A | 2/1996 |
| GB | 2 311 401 A | 9/1997 |
| GB | 2 330 679 A | 10/1998 |

*Primary Examiner*—Y. My Quach-Lee
(74) *Attorney, Agent, or Firm*—Vidas, Arrett & Steinkraus

(57) ABSTRACT

The Par 36 LED lamp may be a replacement and/or original LED lamp adapted for use in applications previously utilizing a Par 36 size lamp having as incandescent, halogen, and/or gaseous discharge xenon illumination source. The Par 36 LED lamp is generally formed of a heat sink housing holding as array of LED illumination elements. A culminator/reflector is preferably positioned over the LED illumination sources to reflect the majority of the emitted light along a desired line of sight. A lens or cover preferably interfaces with the heat sink housing to protect the array of LED illumination sources from contamination and/or exposure to water. Electrical connections including plugs preferably extend rearwardly from the heat sink housing for coupling to as electrical power source for a vehicle or a structure.

19 Claims, 6 Drawing Sheets

U.S. PATENT DOCUMENTS

| | | |
|---|---|---|
| 4,799,135 A | 1/1989 | Inukai et al. |
| 4,918,497 A | 4/1990 | Edmond |
| 4,929,866 A | 5/1990 | Murata et al. |
| 4,935,665 A | 6/1990 | Murata |
| 4,954,822 A | 9/1990 | Borenstein |
| 4,965,644 A | 10/1990 | Kawabata et al. |
| 4,966,862 A | 10/1990 | Edmond |
| 4,990,970 A | 2/1991 | Fuller |
| 5,027,168 A | 6/1991 | Edmond |
| 5,045,767 A | 9/1991 | Wakatake |
| 5,050,055 A | 9/1991 | Lindsay et al. ............ 362/293 |
| D324,921 S | 3/1992 | Stanuch et al. |
| 5,093,768 A | 3/1992 | Ohe |
| 5,097,397 A | 3/1992 | Stanuch et al. |
| 5,097,612 A | 3/1992 | Williams |
| 5,101,326 A | 3/1992 | Roney |
| 5,122,943 A | 6/1992 | Pugh |
| 5,136,287 A | 8/1992 | Borenstein |
| 5,187,547 A | 2/1993 | Niina et al. |
| 5,220,235 A | 6/1993 | Wakimizu et al. |
| 5,233,204 A | 8/1993 | Fletcher et al. |
| 5,235,498 A | 8/1993 | Van Dulmen et al. |
| 5,283,425 A | 2/1994 | Imamura |
| 5,313,187 A | 5/1994 | Choi et al. |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai et al. |
| 5,362,971 A | 11/1994 | McMahon et al. .......... 250/577 |
| 5,403,916 A | 4/1995 | Watanabe et al. |
| 5,406,095 A | 4/1995 | Koyama et al. |
| 5,419,065 A | 5/1995 | Lin |
| 5,420,444 A | 5/1995 | Sawase et al. |
| 5,475,241 A | 12/1995 | Harrah et al. |
| 5,482,896 A | 1/1996 | Tang |
| 5,491,350 A | 2/1996 | Unno et al. |
| 5,498,883 A | 3/1996 | Lebby et al. |
| 5,514,627 A | 5/1996 | Lowery et al. |
| 5,516,727 A | 5/1996 | Broom |
| 5,519,720 A | 5/1996 | Hirano et al. |
| 5,526,237 A | 6/1996 | Davenport et al. |
| 5,528,474 A | 6/1996 | Roney et al. |
| 5,567,036 A | 10/1996 | Theobald et al. |
| 5,569,939 A | 10/1996 | Choi |
| 5,575,459 A | 11/1996 | Anderson |
| 5,580,156 A * | 12/1996 | Suzuki et al. ................ 362/800 |
| 5,585,783 A | 12/1996 | Hall |
| 5,593,223 A | 1/1997 | Koizumi |
| 5,612,231 A | 3/1997 | Holm et al. |
| 5,625,201 A | 4/1997 | Holm et al. |
| 5,627,851 A | 5/1997 | Takahashi |
| 5,631,474 A | 5/1997 | Saitoh |
| 5,632,551 A | 5/1997 | Roney et al. |
| 5,634,711 A | 6/1997 | Kennedy et al. |
| 5,636,916 A | 6/1997 | Sokolowski |
| 5,656,829 A | 8/1997 | Sakaguchi et al. |
| 5,661,742 A | 8/1997 | Huang et al. |
| 5,674,000 A | 10/1997 | Kalley ........................ 362/293 |
| 5,694,112 A | 12/1997 | VannRox et al. |
| 5,697,175 A | 12/1997 | Schwartz |
| 5,705,047 A | 1/1998 | Lee |
| 5,707,891 A | 1/1998 | Izumi et al. |
| 5,739,552 A | 4/1998 | Kimura et al. |
| 5,739,592 A | 4/1998 | Rigsby et al. |
| 5,758,947 A | 6/1998 | Glatt |
| 5,760,531 A | 6/1998 | Pederson |
| 5,785,418 A * | 7/1998 | Hochstein ................... 362/294 |
| 5,789,768 A | 8/1998 | Lee et al. |
| 5,793,062 A | 8/1998 | Kish, Jr. et al. |
| 5,804,822 A | 9/1998 | Brass et al. ................. 250/302 |
| 5,806,965 A | 9/1998 | Deese |
| 5,838,024 A | 11/1998 | Masuda et al. |
| 5,838,247 A | 11/1998 | Bladowski |
| 5,848,837 A | 12/1998 | Gustafson |
| 5,929,788 A | 7/1999 | Vukosie |
| 5,931,562 A | 8/1999 | Arato ......................... 362/184 |
| 5,975,714 A | 11/1999 | Vetorino et al. ............ 362/192 |
| 6,009,650 A | 1/2000 | Lamparter |
| 6,018,899 A | 2/2000 | Haintz |
| 6,028,694 A | 2/2000 | Schmidt ..................... 359/264 |
| 6,095,661 A | 8/2000 | Lebens et al. .............. 362/184 |
| 6,102,696 A | 8/2000 | Osterwalder et al. ......... 433/29 |
| 6,159,005 A | 12/2000 | Herold et al. ................. 433/29 |
| 6,177,678 B1 | 1/2001 | Brass et al. ............... 250/461.1 |

\* cited by examiner

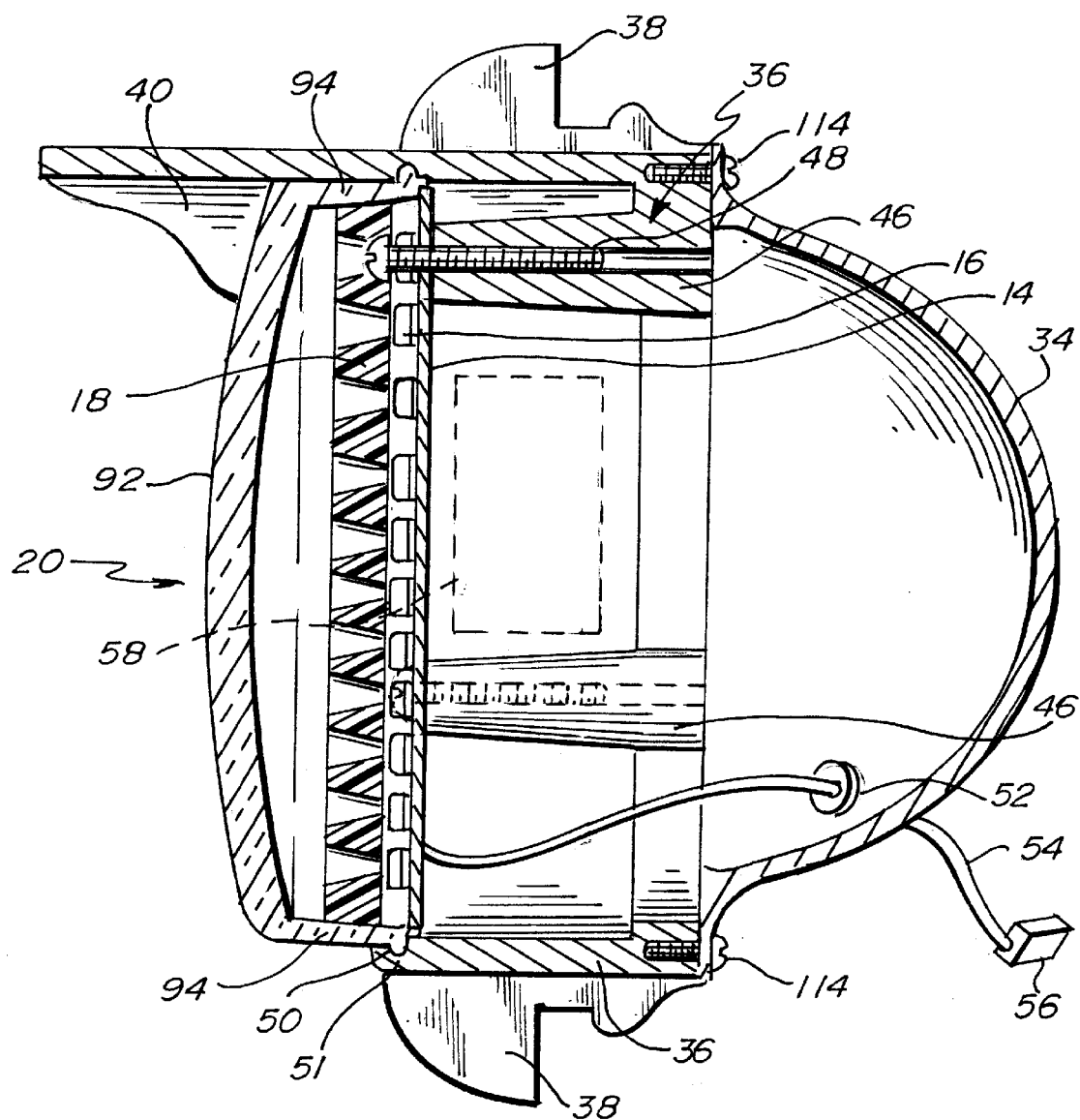
_Fig. 2._
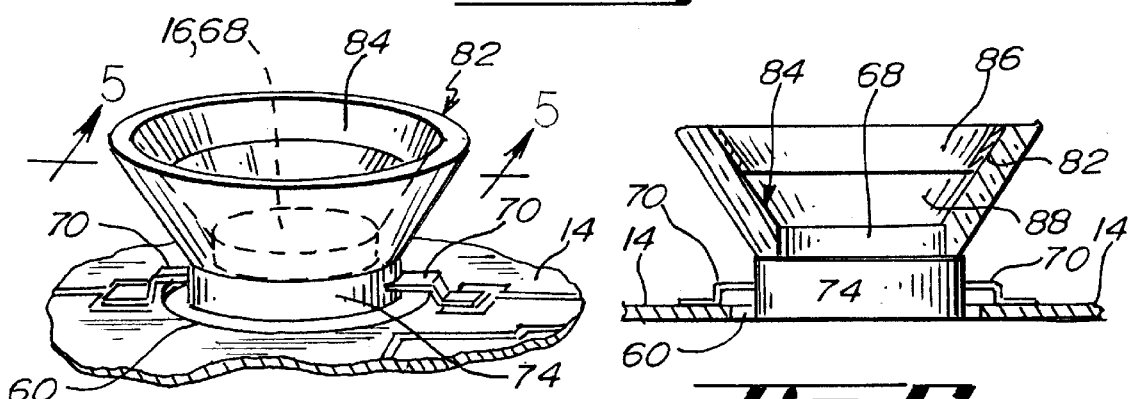
_Fig. 4._   _Fig. 5._

PAR 36 LED UTILITY LAMP

This application claims benefit of provisional application No. 60,147,240 filed Aug. 4, 1999.

BACKGROUND OF THE INVENTION

Light sources have been used on vehicles such as automobiles, motorcycles, fire trucks, police cars, and ambulances, to produce a desired amount of illumination for enhancement of visualization of an area or to warn an observer as to the presence of a vehicle. These light sources may also provide light of various colors and patterns. Generally, these light sources have included reflective back support members or color filters as depicted in U.S. Pat. No. 5,091,828.

Many problems exist with the known methods for producing a light signal. One particular problem involves the size of the light source which may adversely affect the aerodynamic characteristics of the vehicle. Also the known illumination sources require a relatively large amount of electrical current during use. The demands upon the electrical power supply for a vehicle may therefore exceed the available electrical resources reducing optimization of performance for a light source or for a vehicle.

The most common light sources being used include halogen lamps or gaseous discharge xenon lamps. These lamps emanate large amounts of heat which is difficult to dissipate from a sealed light source and may damage the electronic circuitry contained therein. In addition, these types of lamps consume large amounts of current requiring a large power supply or large battery or electrical source for a vehicle. These lamps also generate substantial electromagnetic emissions which may interfere with radio communications for an emergency or other vehicle. Finally, these lamps are generally not rugged and have a relatively short operational life necessitating frequent replacement.

Another problem with the known light sources is the use of filters to produce a desired color. This filtering technique produces more heat that must be dissipated. Moreover, changing the color of the light source requires the physical removal of the filter from the light source and the insertion of a new filter. Furthermore, filters fade or flake making them unable to consistently produce a desired color.

These problems associated with traditional signal lamps are exasperated by the fact that a plurality of different light signals may be desired from a single light source. Further, there is little flexibility in modifying a traditional light source as created by a lamp.

Other problems associated with the known illumination sources include the size and shape of the light source which has in the past limited or restricted available positioning on a vehicle. In the past, light sources due to the relatively large size of the illumination elements were required to be placed within a head lamp receiver for a vehicle or at a location which did not interfere with, or obstruct, an operator's ability to visualize objects while seated in the interior of the vehicle.

The performance of a light source is a primary concern to personnel regardless of the location of the light source upon a vehicle. In the past, optimal observation of a light source has occurred when an individual was either in front of, or behind, a vehicle. Observation from the sides, or at an acute angle relative to the sides, frequently resulted in reduced observation of a light source. A need therefore exists to improve the observation of a light source for a vehicle regardless of the location of an observer. A need also exists to increase the flexibility of a light source for placement at a plurality of locations about a vehicle for observation by individuals.

In the past, flashing and/or strobe light signals emanating from a light source have been used to signal the presence of an emergency situation necessitating caution. A need exists to reduce the size of light sources on an emergency vehicle and to improve the efficiency of the light sources particularly with respect to current draw and reduced aerodynamic drag. A need also exists to enhance the flexibility of positioning of light sources about a vehicle for observation by individuals. In order to satisfy these and other needs, more spatially efficient light sources such as LED's are required. It is also necessary to provide alternative colored LED light sources which may be electrically controlled for the provision of any desired pattern of light signal such as flashing, pulsating, oscillating, modulating, and/or strobe light effects without the necessity of spatially inefficient and bulky mechanical rotational devices. A need also exists to provide a spatially and electrically efficient white LED light source for use on an emergency vehicle which provides a flashing, pulsating, modulated, oscillating, and/or strobe light effect without the necessity of mechanical devices.

In view of the above, there is a need for a light source that: (1) is capable of producing multiple light signals; (2) produces the appearance of a modulated light signal without relying upon mechanical components; (3) generates little heat; (4) uses substantially less electrical current; (5) produces significantly reduced amounts of electromagnetic emissions; (6) is rugged and has a long life span; (7) produces a truer light output color without the use of filters; (8) reduces current draw upon a vehicle power supply; and (9) is positionable at a variety of locations about a vehicle without adversely effecting the vehicle operator's ability to observe objects while seated in the interior of the vehicle.

Illumination devices for emergency vehicles in the past have incorporated utility parabolic lens reflector enclosures for focusing the light output from a light source. The signaling devices as known are commonly referred to as "unmarked corner tubes," "hide-away tubes," or "dome tubes" (Hide-away Tubes is the trade name of Whelan Engineering Company). These signaling devices as known frequently utilize xenon gaseous discharge tubes or incandescent lamps as illumination sources.

A problem with the prior art is the cost and failure rate of the known "unmarked corner tubes," "hide-away tubes," or "dome tubes." The failure rate of these devices typically results in significant amounts of down time for a vehicle to enable replacement. In addition, individuals are frequently unaware that a vehicle light is inoperative requiring replacement. This condition may reduce the safety to an officer during the performance of his or her duties. In addition, the reduced life span and failure rate of the known illumination devices significantly increases the operational costs associated with material replacement and labor. A need, therefore, existed to enhance the durability and to reduce the failure rate of illumination devices while simultaneously reducing the cost of a replacement illumination source.

In the past, the xenon gaseous discharge lamps have utilized a sealed compartment, usually a gas tube, which may have been filled with a particular gas known to have good illuminating characteristics. One such gas used for this purpose was xenon gas, which provides illumination when it becomes ionized by the appropriate voltage application. Xenon gas discharge lamps in the past have been used in the automotive industry to provide high intensity lighting on emergency vehicles to provide a visible emergency signal light.

A xenon gas discharge lamp usually comprises a gas-filled tube which has an anode element at one end and cathode element at the other end, with both ends of the tube being sealed. The anode and cathode elements each have an electrical conductor attached which passes through the sealed gas end of the lamp exterior. An ionizing trigger wire is constrictively rolled in a helical manner about the exterior of the glass tube, and this wire is connected to a high voltage power source typically on the order of 10–12 kilowatts (Kv). The anode and cathode connections are connected to a lower level voltage source which is sufficient to maintain illumination of the lamp once the interior gas has been ionized by the high voltage source. The gas remains ignited until the anode/cathode voltage is removed; and once the gas ionization is stopped, the lamp may be ignited again by reapplying the anode/cathode voltage and reapplying the high voltage to the trigger wire via a voltage pulse.

Xenon gas lamps are frequently made from glass tubes which are formed into semicircular loops to increase the relative light intensity from the lamp while maintaining a relatively small size factor. These lamps generate extremely high heat intensity and, therefore, require positioning of the lamps so as to not cause heat buildup in nearby components. The glass tube of a xenon lamp is usually mounted on a light-based pedestal which is sized to fit into an opening in the light fixture and to hold the heat generating tube surface in a light fixture compartment which is separated from other interior compartment surfaces. In a vehicle application, the light and base pedestal are typically sized to fit through an opening in the light fixture which is about one inch in diameter. The light fixture component may have a glass or plastic cover made from colored material so as to produce a colored lighting effect when the lamp is ignited. Xenon gas discharge lamps naturally produce white light and this may be made to produce a colored light, of lesser intensity, by placing a xenon lamp in a fixture having a colored lens. The glass tube of the xenon lamp may also be painted or otherwise colored to produce a similar result, although the light illumination from the tube tends to dominate the coloring; and the light may actually have a colored tint appearance rather than a solid color light. The color blue is particularly hard to produce in this manner.

Because a preferred use of xenon lamps occurs in connection with vehicles and particularly emergency vehicles, it is particularly important that the lamp be capable of producing intense coloring associated with emergency vehicles; i.e., red, blue, amber, green, and clear or white.

When xenon lamps are mounted in vehicles, some care must be taken to reduce the corroding effects of water and various chemicals, including road salt, which may contaminate the light fixture. Corrosive effects may destroy the trigger wire and the wire contacts leading to the anode and cathode. Corrosion is enhanced because of the high heat generating characteristics of the lamps which may keep the air inside the lamp fixture when the lamp is in use, and this heated air may condense when the light is off to build up moisture inside the fixture. The buildup of moisture may result in the shorting of the electrical wires and degrade the performance of the initial wire preventing proper ionization of the gas within the xenon gas discharge lamp.

In the past, illumination of an area in front or to the sides of an emergency vehicle during low light conditions has been problematic. Headlamps and take-down lights have been utilized by law enforcement personnel for a number of purposes including, but not limited to, enhancing observation of an individual in a vehicle on a roadway subject to investigation and to hide the location of an officer or to block or deter observation of an officer by individuals.

The headlamps and take-down light sources as know have generally been formed of halogen or gaseous discharge xenon lamp illumination sources which have a relatively short useful life, are bulky, have a relatively large current draw and which require frequent replacement. A need exists for a headlamp or take-down light which is spatially efficient, has a long useful life, and has reduced current draw requirements for use on a vehicle or as used as a utility light source.

In addition, alley lights as known also suffer from the deficiencies as identified for the take-down lights during dark illumination conditions. Alley lights are used to illuminate areas adjacent to the sides of a vehicle.

A problem has also existed with respect to the use of an emergency light source on unmarked law enforcement vehicles. In the past, emergency lights for unmarked law enforcement vehicles have consisted of dome devices which are formed of revolving mechanisms. These lights are usually withdrawn from a storage position under a motor vehicle seat for placement upon the dashboard of a law enforcement vehicle. In undercover situations it has been relatively easy to identify dashboard affixation mechanisms used to secure these types of dome illumination devices to a dashboard. The known dome devices are also clumsy, have large current draw requirements, and are difficult to store in a convenient location for retrieval in an emergency situation by an individual. A need exists for an emergency vehicle or utility warning light which is spatially efficient, easily hidden from view, and is transportable by an individual for retrieval during an emergency situation.

A need also exists for a light source having enhanced flexibility for provision of new and additional light signals including but not limited to strobe, modulated, pulsating, rotational, oscillating, flashing, and/or sequential light signals.

In the past, vehicles such as motorcycles, automobiles, emergency vehicles, and aircraft have used halogen, incandescent and/or gaseous discharge xenon illumination sources in a three inch diameter lamp housing identified as a "Par 36 lamp". The "Par 36 lamps" have also been utilized in conjunction with rotational mechanical devices as enclosed within a dome shaped housing. These known illumination sources for "Par 36 lamps" include various drawbacks including, but not limited to, lack of durability necessitating frequent replacement, insufficient emitted illumination, requirements of a relatively large current draw and transmitting undesirable RF electromagnetic radio interference. A need therefore exists for an alternative illumination source for the "Par 36 lamp" which solves these and other problems while maximizing the utility and cost efficiencies to an individual.

SUMMARY OF THE INVENTION

The Par 36 lamp may be formed of an array of LED's or a single LED mounted upon and in electrical communication with a circuit board connected to an electrical power source. The circuit board may have dimensions of approximately three inches in diameter. Each circuit board or solitary light source may include an affixation mechanism to facilitate attachment at various locations on and/or around a vehicle. A plurality of Par 36 lamps may be electrically coupled in either a parallel or series manner at the discretion of an individual. A plurality of Par 36 lamps each containing an array or singular LED light source may be in electrical communication with a power supply and a controller to selectively illuminate LED's to provide for the appearance of a pulsating, modulating, strobe, oscillating, stationary, and/or a flashing light source. The controller is preferably in electrical communication with the power supply and the LED light sources to modulate the power intensity for the LED light sources for variable illumination to provide for the appearance of pulsating, modulated, oscillation, strobe, flashing, and/or stationary lights without the necessity for mechanical devices. The Par 36 lamps may be used at any location about a vehicle as desired by an individual.

According to the invention, there is provided a Par 36 lamp including one or more light-emitting diodes (LED's) which may be depicted in several embodiments. In general, the Par 36 lamp comprises an array of LED light sources or a solitary LED light source configured on a light support and in electrical communication with a controller and a power supply, battery, or other electrical source. The Par 36 lamp may also provide various colored light signals as desired for use upon a vehicle.

The Par 36 lamp preferably includes a standard mounting base which may be configured in size to be releasably secured in the standard receiving unit for replacement of an xenon or incandescent light source as used on a vehicle. The standard mounting base may generally be circular or rectangular in shape and may be in electrical communication with a controller, power supply, battery, or other electrical source via the use of a connection wire having a suitable plug.

Extending from the standard mounting base is preferably an LED light source which includes one or a plurality of LED lamps which may be formed of the same or different colors as desired by an individual. The Par 36 lamp may provide various colored light signals of any desired pattern including strobe, flashing, pulsating, and/or modulated for use on a vehicle as a utility light source. The Par 36 lamp may be used with stationary lights, strobe lights, as a revolving light, a pulsating light and/or an oscillating light at the preference of an individual. The Par 36 lamp may also include a reflector assembly.

The Par 36 lamp may also be transportable for easy connection to a stand such as a tripod for electrical connection to a power supply, battery, or other electrical source as a stand-alone signal. In addition, the Par 36 lamp may be electrically coupled to a controller used to modulate the power intensity for the light source to provide for various independent patterns of illumination to create unique light signals or light effects without the use of mechanical devices for rotation and/or oscillation movement.

Pulsating, or oscillating light signals may be produced by selective illumination of LED's on a stationary light support or by the provision of a modulated power intensity for the Par 36 lamp. However, the Par 36 lamp may also be rotated or oscillated via mechanical means. Alternatively a reflector assembly may be utilized which may be rotated to provide the appearance of rotation for the light source. The Par 36 lamp may also be transportable for easy connection to a stand such as a tripod for electrical connection to a power supply as a stand-alone light signal.

The Par 36 lamp may be used as take-down and/or alley lights by law enforcement vehicles to illuminate dark areas during night hours. The Par 36 lamp may also include one or more reflective culminators to enhance the performance of the observed light signal.

The Par 36 lamp may also be used as an intersection clearing light which may be an adaptation of the alley light as mounted to an electrically powered motor for oscillation of the light at 45° angles forwardly and backwardly from a 90° angle perpendicular to the driver or passenger side of an emergency vehicle. The Par 36 lamp functioning as an intersection clearing light is preferably mounted to a motor which rotates or oscillates the Par 36 lamp with respect to a light bar or vehicle. The intersection clearing light is generally activated when an emergency vehicle enters an intersection to warn traffic as to the presence of the emergency vehicle within the intersection. The Par 36 lamp as mounted to the intersection clearing light motor may be positioned proximate to each exterior end of a light bar. When the intersection clearing light motor is not engaged the Par 36 lamp may be used as the alley light to provide illumination at any desired angle relative to the passenger or drivers side of an emergency vehicle. The alley light and intersection clearing light are generally not used simultaneously on an emergency vehicle.

The Par 36 LED lamp may be used as a replacement and/or original LED lamp adapted for applications previously utilizing an incandescent, halogen, and/or gaseous discharge xenon illumination source. The Par 36 LED lamp is generally includes a heat sink housing holding an array of LED illumination elements. A culminator/reflector assembly is preferably positioned adjacent to the LED illumination sources to reflect the majority of the emitted light along a desired line of sight. A lens or cover preferably interfaces with the heat sink housing to protect the array of LED illumination sources from contamination and/or exposure to water or adverse environmental conditions. Electrical connections including plugs preferably extend rearwardly from the heat sink housing for coupling to an electrical power source or controller for a vehicle or a structure.

A principal object of the present invention is the provision of a Par 36 lamp which includes light emitting diode technology which is formed of relatively simple and inexpensive design, construction, and operation and which fulfills the intended purpose of improving the efficiency of a light source for illumination emitted from a vehicle without fear of injury to persons and/or damage to property.

Another principal object of the present invention is the provision of a Par 36 lamp which includes light emitting diode technology which is flexible and which may be attached to any desired location about a vehicle.

Still another principal object of the present invention is the provision of a Par 36 lamp including LED technology which is weather/moisture resistant, rugged, has an increased useful life, and which may be easily visualized thereby enhancing the safety of persons operating a vehicle.

Still another principal object of the present invention is the provision of a Par 36 lamp which includes LED technology and which is operated by a controller to provide any desired type or color of light signal including but not limited to pulsating, strobe, flashing, modulated and/or stationary lights without the necessity for mechanical devices.

Still another principal object of the present invention is the provision of an Par 36 lamp having improved visualization, aerodynamic efficiency, and electrical efficiency.

Still another principal object of the present invention is the provision of a Par 36 lamp which may be used as an LED take-down light which is extremely bright for flooding an area in front of a law enforcement vehicle with light during dark illumination conditions.

Still another principal object of the present invention is the provision of a Par 36 lamp which may be used as an LED alley light which is extremely bright for flooding of an area to the sides of a law enforcement vehicle with light during dark illumination conditions.

Still another principal object of the present invention is the provision of a Par 36 lamp which may be used as an LED alley light which may be rotated similar to a "spot light" for illumination of areas adjacent to a law enforcement vehicle.

Still another principal object of the present invention is the provision of a Par 36 lamp which may be used by a law enforcement officer to illuminate an area to easily visualize individuals or occupants located in a vehicle.

Still another principal object of the present invention is the provision of a Par 36 lamp for use as an LED take-down light which is extremely bright which prohibits an individual located in a temporarily stopped vehicle from observing the location or actions of law enforcement personnel.

Still another principal object of the present invention is the provision of a Par 36 lamp having prolonged useful life.

Still another principal object of the present invention is the provision of a Par 36 lamp which is formed of sturdy construction having reduced current draw requirements for a vehicle.

Still another principal object of the present invention is the provision of a Par 36 lamp which is spatially efficient for use upon a vehicle.

Still another principal object of the present invention is the provision of a Par 36 lamp for use with unmarked law enforcement vehicles.

Still another principal object of the present invention is the provision of a Par 36 lamp which is flexible and may provide a wide variety of illumination signal combinations and/or appearances.

Still another principal object of the present invention is the provision of a Par 36 lamp which may be easily retrieved for use upon an emergency vehicle.

Still another principal object of the present invention is the provision of a Par 36 lamp which has low current draw requirements for a vehicle.

Still another principal object of the present invention is the provision of a Par 36 lamp which may be easily connected to a power source of a vehicle.

Still another principal object of the present invention is the provision of a Par 36 lamp which may be easily positioned upon the front or rear dashboards or on the front or rear bumpers of a vehicle.

Still another principal object of the present invention is the provision of a Par 36 lamp which may be easily and completely hidden from view during periods of non-use.

Still another principal object of the present invention is the provision of a Par 36 lamp which is very bright during use as utility signaling device or within an emergency situation.

Still another principal object of the present invention is the provision of a Par 36 lamp which has an improved useful life as compared to the halogen and/or gaseous xenon illumination sources.

Still another principal object of the present invention is the provision of a Par 36 lamp which may be used as an intersection clearing light which is visible to traffic perpendicular to the direction of travel of an emergency vehicle within an intersection.

Still another principal object of the present invention is the provision of a Par 36 lamp which reduces RF electromagnetic and/or radio emissions from a light source.

Still another principal object of the present invention is the provision of a replacement Par 36 lamp which may be easily adapted for use upon a vehicle.

Still another principal object of the present invention is the provision of a Par 36 LED lamp which may easily replace an existing incandescent, halogen, or gaseous discharge xenon Par 36 sized illumination source.

Still another principal object of the present invention is the provision of a Par 36 LED lamp which shields the electrical components of a vehicle and/or structure from heat exposure or damage caused during use of LED illumination sources.

Still another principal object of the present invention is the provision of a Par 36 LED lamp which increases available illumination through use of a culminator and/or reflector.

Still another principal object of the present invention is the provision of a Par 36 LED lamp which is sturdy and is protected from contamination from the environment or exposure to water.

Still another principal object of the present invention is the provision of a Par 36 LED lamp for use as aircraft landing lights, rotational lights within a housing, grill lights for a vehicle, headlamps for a vehicle such as a motorcycle, bumper lights, and/or rear deck flashing lights for an emergency vehicle.

Still another principal object of the present invention is the provision of a Par 36 lamp which generates substantially less heat than traditional warning signal lights.

Still another principal object of the present invention is the provision of a Par 36 lamp which produces a truer light output color without the use of filters.

Still another principal object of the present invention is the provision of a Par 36 lamp which permits an individual to adjust the color of the light signal without having to make a physical adjustment from a multi-colored panel.

Still another principal object of the present invention is the provision of a Par 36 lamp which may be easily customized by the user via the use of a microprocessor/controller.

Still another principal object of the present invention is the provision of a Par 36 lamp which may be used to create a bright burst of intense colored light to enhance the visibility and safety of a vehicle in an emergency signaling situation.

Still another principal object of the present invention is the provision of a Par 36 lamp having a reduced expense and further having a reduced failure rate.

Still another principal object of the present invention is the provision of a Par 36 lamp which produces brilliant lighting in any of the colors associated with an emergency vehicle such as red, blue, amber, green, and/or white.

Still another principal object of the present invention is the provision of a Par 36 lamp having an extended life cycle which continues to operate at maximum efficiency throughout its life cycle.

Still another principal object of the present invention is the provision of a Par 36 lamp which is simple and may facilitate the ease of installation and replacement of an xenon and/or incandescent light source for a vehicle.

Still another principal object of the present invention is the provision of a Par 36 lamp which reduces RF emissions which may interfere with other radio and electronic equipment in an emergency vehicle.

A feature of the present invention is the provision of a Par 36 light having a single LED or an array of LED's of white colored light for illumination of an area in front of a vehicle during dark illumination periods.

Still another feature of the present invention is the provision of a Par 36 lamp having LED illumination sources where the Par 36 lamp is incorporated into a light bar for the provision of white colored light for illumination of an area in front of a vehicle during dark illumination periods.

Still another feature of the present invention is the provision of a Par 36 lamp formed of one or more LED light sources of white colored light as connected to, or integral with, a circuit board which is electrically coupled to a power source for a vehicle.

Still another feature of the present invention is the provision of a Par 36 lamp for use as an alley light formed of a single LED or an array of LED's of white colored light for illumination of an area to the sides of a vehicle during dark illumination periods.

Still another feature of the present invention is the provision of a Par 36 lamp which may be mounted to an actuator to rotate the Par 36 lamp for providing illumination at acute angles relative to the sides of a vehicle.

Still another feature of the present invention is the provision of a Par 36 lamp having one or more culminators integral to each individual LED light source to reflect light along a desired line of sight during use of the Par 36 lamp.

Still another feature of the present invention is the provision of a Par 36 lamp having one or more LED illumination sources for releasable attachment to a front or rear dashboard of a vehicle.

Still another feature of the present invention is the provision of a Par 36 lamp having plug in connectors for coupling to an electrical power source for a vehicle such as a cigarette lighter.

Still another feature of the present invention is the provision of a Par 36 lamp in communication with a controller for the provision of any desired lighting effect including, but not limited to, flashing, pulsating, modulating, and/or strobe light signals.

Still another feature of the present invention is the provision of a Par 36 lamp including a plurality of colored LED light sources.

Still another feature of the present invention is the provision of a Par 36 lamp which includes a battery for provision of a light signal when connection to an electrical power source is not immediately available.

Still another feature of the present invention is the provision of a Par 36 lamp coupled to an electric motor to oscillate and to function as an intersection clearing light for rotation of the light source 45° forwardly and 45° 0 rearwardly of a perpendicular axis of an emergency vehicle for communication to traffic adjacent to an intersection as to the presence of an emergency vehicle and/or emergency situation.

Still another feature of the present invention is the provision of a Par 36 lamp which may function as an alley light when not being used as an intersection clearing light.

Still another feature of the present invention is the provision of a Par 36 LED lamp having a heat sink housing adapted to dissipate heat and reduce heat exposure to adjacent components during use of LED illumination sources.

Still another feature of the present invention is a Par 36 LED lamp having an array of LED illumination sources mounted to a circuit board which in turn is secured within the heat sink housing.

Still another feature of the present invention is the provision of a Par 36 LED lamp having a culminator/reflector having a plurality of reflective cups adapted to surround each individual LED illumination source for reflection of emitted light along a desired line of sight during use of the Par 36 LED lamp.

Still another feature of the present invention is the provision of a Par 36 LED lamp having a culminator/reflector having bands of transparent and/or reflective surfaces for reflection of a desired amount of emitted illumination.

Still another feature of the present invention is the provision of a Par 36 LED lamp having a lens cover adapted for engagement to the heat sink housing.

Still another feature of the present invention is the provision of a Par 36 LED lamp having a lens cover adapted to protect the LED illumination sources from environmental contamination and/or exposure to water.

Still another feature of the present invention is the provision of a Par 36 lamp having LED technology where the LED illumination sources are enclosed within a transparent and water resilient enclosure to prevent water and/or other contamination.

Still another feature of the present invention is the provision of a Par 36 lamp having LED technology which includes a circuit board having an array formed of a plurality of LED light sources and an affixation member secured to the circuit board for attachment to vehicle.

Still another feature of the present invention is the provision of a Par 36 lamp coupled to a controller which is in electrical communication with one or a plurality of LED light sources for the provision of a modulated power intensity to create the appearance of pulsating, strobe, flashing a continuous light signal without the necessity of mechanical devices.

Still another feature of the present invention is the provision of a plurality of light emitting diodes integral to a circuit board, where the LED's are aligned in vertical columns and horizontal rows.

Still another feature of the present invention is the provision of a Par 36 lamp having a plurality of colored LED's and a controller capable of selecting LED's of the same color to produce a single or mixed colored light signal.

Still another feature of the present invention is the provision of a Par 36 lamp which may be easily connectable and/or removed from a transportable support such as a tripod for placement of a Par 36 lamp at any location as desired by an individual.

Still another feature of the present invention is the provision of a Par 36 lamp which may be easily connectable to an emergency vehicle, including but not limited to, automobiles, ambulances, trucks, motorcycles, snowmobiles, fire trucks, and/or any other type of vehicle in which warning signal or emergency signal lights is utilized.

Still another feature of the present invention is the provision of a Par 36 lamp where the provision of power may be modulated by the controller to produce a modulated power intensity for the light sources to provide a desired pattern of illumination to create the illusion of rotation for the light source without the use of mechanical devices.

BRIEF DESCRIPTION OF THE DRAWINGS

FIG. 2 is a cross-sectional side view of the Par 36 LED lamp taken along the line of 2—2 of FIG. 1;

FIG. 4 is a detail view of a reflector cup;

FIG. 5 is a cross-sectional side view of the reflector cup taken along the line of 5—5 of FIG. 4;

DETAILED DESCRIPTION OF THE PREFERRED EMBODIMENT

Figure 1:
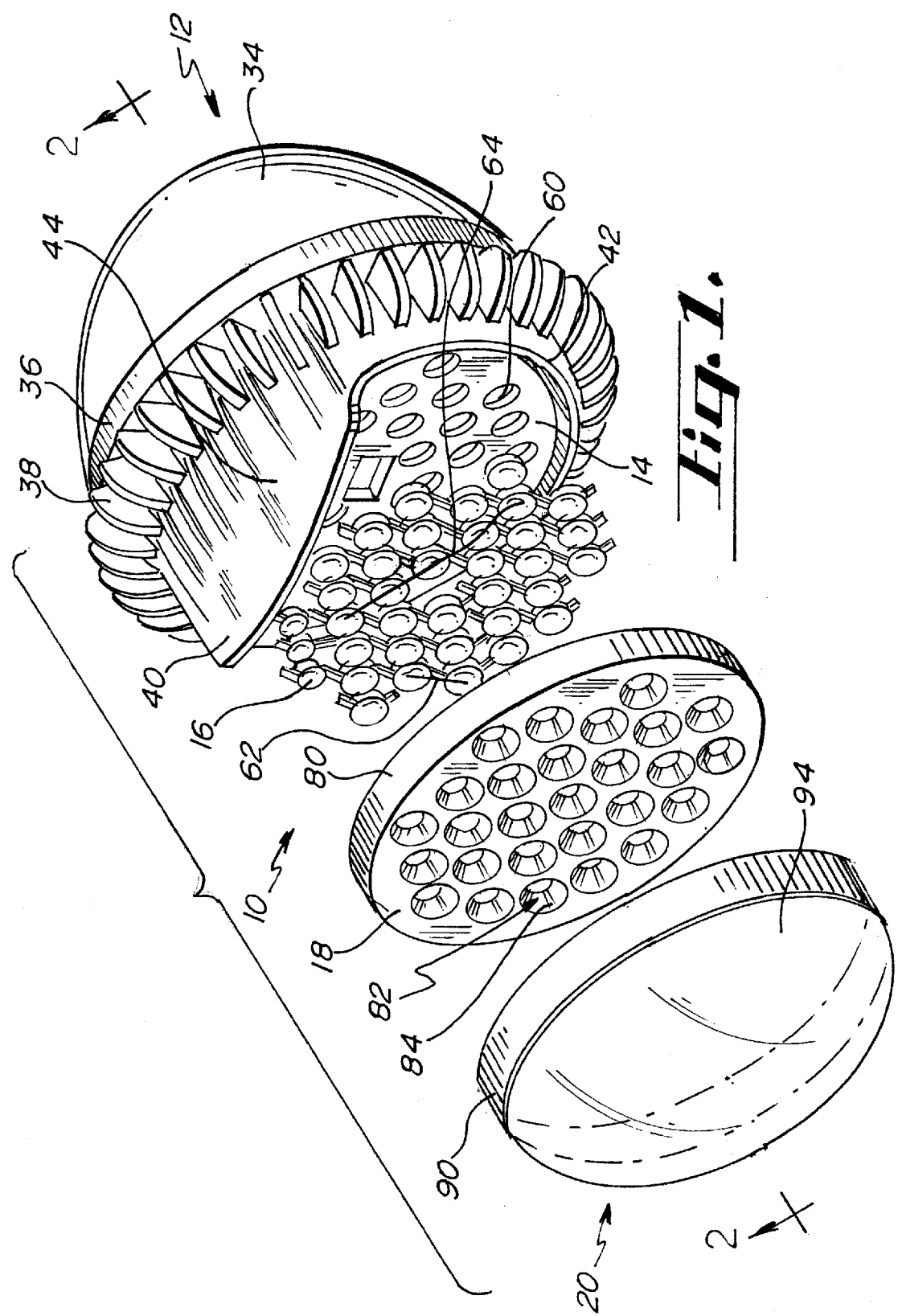
FIG. 1 is an exploded view of the Par 36 LED lamp.

The Par 36 lamp described and claimed herein is based upon and claims priority to Provisional Patent Application Ser. No. 60/147,240, Filed Aug. 4, 1999, and which is incorporated herein by reference.

One embodiment of the Par 36 LED lamp is illustrated and described herein. In general, the Par 36 LED lamp is referred to by the numeral 10. In general, the Par 36 LED lamp 10 is formed of a housing 12, a circuit board 14 disposed in the housing 12, a plurality of LED light sources 16 electrically coupled to the circuit board 14, a culminator 18 disposed over the plurality of LED light sources 16, and a lens cover 20 secured to the housing 12 to enclose the culminator 18, the plurality of LED light sources 16, and the circuit board 14.

In general, the Par 36 lamp 10, including the plurality of LED light sources 16, provides the benefits of reduced heat generation, reduced current draw, reduced electromagnetic emissions, increased useful life, and the provision of a truer light output color as compared to traditional gaseous discharge and/or halogen illumination sources. In addition, the benefits of use of high technology LED illumination sources within the Par 36 lamp 10 include reduced RF radio emissions, increased useful life, increased durability and the provision of brighter illumination and truer light output color during use of a vehicle.

The Par 36 LED lamp 10 may be used in conjunction with an emergency vehicle 22, a vehicle, and/or a stand alone support such as a base or tripod 24. In addition, the Par 36 LED lamp 10 may be mounted upon the front or rear dashboards, front or rear bumpers, or to a light bar 130 as integral to an emergency vehicle 22. Alternatively, the Par 36 lamp 10 may be mounted to a gyrator 32 for the provision of an oscillating and/or rotational light source as desired by an individual.

Figure 12:
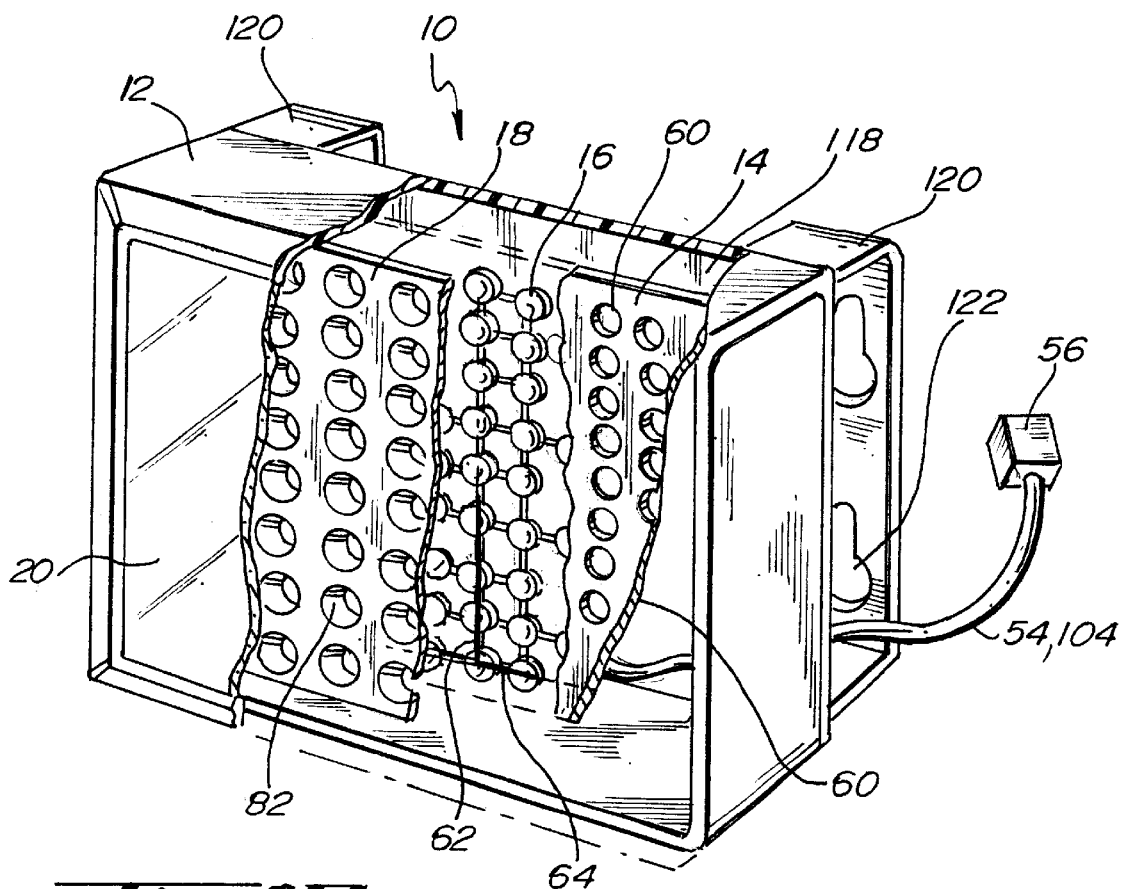
FIG. 12 is an alternative embodiment of the utility LED lamp.
Figure 6:
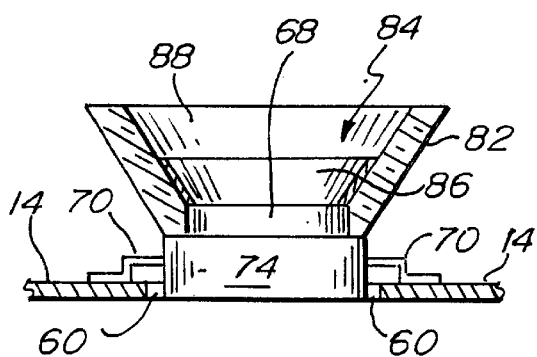
FIG. 6 is an alternative cross-sectional side view of the reflector cup taken along the line of 5—5 of FIG. 4.
Figure 7:
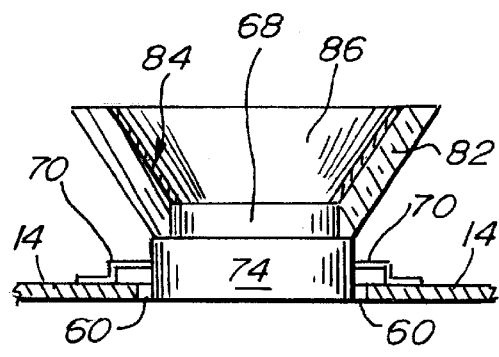
FIG. 7 is an alternative cross-sectional side view of the reflector cup taken along the line of 5—5 of FIG. 4.

The Par 36 LED lamp 10 preferably includes a heat sink housing 12 which functions to shield the components of a vehicle or structure from exposure and/or damage to heat generated during use of the individual LED illumination sources 16. The heat sink housing 12 preferably includes a rear dome 34 which may be integral or attached to a substantially cylindrical frame or body 36. Alternatively, the heat sink housing 12 may be substantially rectangular for use with a utility LED lamp 10 as depicted in FIG. 12. A plurality of support veins 38 preferably extend upwardly and outwardly about the perimeter of the substantially cylindrical frame 36 in a diverging relationship with respect thereto. Alternatively, the substantially cylindrical frame 36 may be referred to as the body portion of the housing 12.

A visor 40 preferably extends forwardly from the body 36. The visor 40 may also include a ring section 42 which may be either affixed to or integral with the support veins 38 extending about the circumference and periphery of the housing 12. The visor 40 may also include one or more support elements 44 to enhance the structural strength of the visor 40. The visor 40 preferably functions to reduce transmission of light upwardly from the Par 36 LED lamp 10 into an individuals eyes. The visor 40 thereby assists in the transmission of light forwardly along a desired line of sight for a vehicle 22.

The housing 12, body 36, support veins 38, and visor 40 may be formed of any material as preferred by an individual including but not limited to plastic, fibreglass, metal, and/or plastic. It should be noted that other alternative materials may be selected for the housing 12, body 36, support veins 38, visor 40, and support elements 44 at the discretion of an individual provided that the essential functions, features, and attributes described herein are not sacrificed.

As may be seen in FIG. 2, the body 36 of the housing 12 preferably includes one or more boss sections 46 which may be threaded and which are adapted to securely receive a screw 48. The screw 48 is preferably used to attach the culminator 18 and circuit board 14 to the body 36. The boss sections 46 are preferably positioned at equal distances around the circumference and perimeter of the body 36. As depicted in FIG. 2, the Par 36 LED lamp 10 preferably has three equally spaced boss sections 46. The Par 36 LED lamp 10 also preferably has three equally spaced affixation members 114 which are used to secure the rear dome 34 to the body 36. The number of affixation members 114 or boss sections 46 may be increased or decreased at the preference of an individual provided that a sufficient number of boss sections 46 are provided to securely affix the culminator 18 and circuit board 14 to the housing 12 during use of the Par 36 LED lamp 10.

The rear dome 34 preferably includes an aperture 52 which provides for passing engagement of electrical contacts such as wires 54 which may include plug in adaptors 56 for use in coupling to an electrical power supply to provide power to the Par 36 LED lamp 10.

The rear dome 34 is preferably used as a mounting surface for the Par 36 LED lamp 10 for affixation to a vehicle, structure, or surface. The support veins 38 preferably provide a dual function first enhancing structural strength and integrity to the Par 36 LED lamp 10 as well as promoting the aerodynamic efficiency and aesthetic appearance of the Par 36 LED lamp 10 during use. Further, the support veins 38 may assist in the reflection of illumination along a desired line of sight during use of the Par 36 LED lamp 10. The visor 40 also preferably functions to assist in the reflection of light illuminated from the individual LED light sources 16 along a desired visual line of sight and away from an individual positioned above or behind the Par 36 LED lamp 10.

The circuit board 14 preferably includes wires 54 for passing through the rear dome 34 for coupling to an electrical power source and/or controller 58. Alternatively, the controller 58 may be integral to the circuit board 14 as preferred by an individual.

The individual LED light sources 16 are preferably electrically coupled to the circuit board 14 which may include a plurality of heat sink wells 60 (FIG. 1). The circuit board 14 having the heat sink wells 60 is preferably securely connected to the heat sink housing 12 proximate to the body 36 by the passage of the screw 48 into the boss sections 46.

The material selected for the heat sink housing 12 preferably provides for heat dissipation relative to adjacent components of a vehicle to minimize risk of damage and/or exposure to heat generated by the individual LED illumination sources 16 during use of the Par 36 LED lamp 10. The circuit board 14 also functions to initially dissipate heat due to the placement of the LED light sources 16 within the heat sink wells 60.

The circuit board 14 may be circular in shape and is adapted for positioning inside the circumference of the heat sink housing 12. The diameter dimension for the circuit board 14 is preferably three inches, however, the diameter dimension indicated herein may vary at the discretion of an individual provided that the diameter dimension selected is sufficient for positioning of the circuit board 14 within the interior of the heat sink housing 12 during assembly of the Par 36 LED lamp 10. The circuit board 14 may be relatively rigid or flexible at the discretion of an individual without sacrificing the essential features, functions, and attributes described herein. It should be noted that the circuit board 14 is preferably of a sufficient durability and sturdiness to not fracture and/or fail during use of the Par 36 LED lamp 10 upon a vehicle 22.

The individual LED light sources 16 are preferably in electrical communication with the circuit board 14 having the wire connectors 54 adapted for coupling of the plug in adaptors 56 to a suitable power source. The power source selected may be a low voltage power supply or a 12 volt power supply which is available in a standard emergency vehicle battery or other vehicle. The low voltage power supply or battery source may be integral to a vehicle or other structure. Alternatively, an electrical generator may be used as the electrical power source and electrically coupled to the plug in adaptors 56 for the provision of power to the Par 36 LED lamp 10.

The controller 58 is preferably used to activate the LED light sources 16 during use of the Par 36 LED lamp 10. The controller 58 may selectively activate individual light source 16 or columns 62 and/or rows 64 of individual LED light sources 16 to provide a constant light signal, a strobe light signal, a flashing light signal, a pulsating light signal, and/or a modulated light signal at the preference of an individual. The controller 58 generally includes a microprocessor and circuitry which is preferably contained within and/or attached to, the interior or the rear dome 34 of the housing 12. It is envisioned that the controller 58 may be programmed and powered through the electrical wires 54. In the preferred embodiment the controller 58 is coupled to the circuit board 14 having a microprocessor attached to a low voltage power supply, battery, or electrical source. A microprocessor is configured through circuitry to selectively activate columns 62, rows 64, and/or individual LED light sources 16. It should be noted that the controller 58 is capable of activating individual LED light sources 16 to allow for greater flexibility in the type of light signal created. In this regard, the controller 58 is capable of selectively illuminating LED light sources 16 which are colored other than white for the provision of a unique illumination signal for a vehicle 22.

It should be noted that the controller 58 may be used to provide a modulated power intensity for the Par 36 LED lamp 10. A modulated power intensity enables the provision of various patterns of illumination which may create a unique lighting effect for a light source. The controller 58 preferably regulates and/or modulates the power supply to the LED light sources 16 and thereby varies the intensity of the observed light. It is anticipated that the controller 58 may modulate the power supply to the individual LED light sources 16 in accordance with a sine wave pattern having a range of zero to full intensity. At the instant of full intensity, the controller 58 may also regulate a power burst for observation at full intensity. The controller 58 operating to regulate and/or modulate the power intensity for the LED light sources 16 may establish a unique appearance for the Par 36 LED lamp 10 without the necessity for mechanical devices. In addition, the current requirements from the electrical system for a vehicle 22 may thereby be reduced. In addition, spatial and size considerations for a vehicle 22 are optimized by the elimination of the necessity of mechanical devices for either rotation or oscillation movement of the Par 36 LED lamp 10.

The controller 58 may also provide for selective illumination of individual LED light sources 16 to provide a unique color such as blue, amber, green, red, and/or white or any combination thereof at the discretion of an individual. In addition, the controller 58 may regulate the power supplied to various individual LED light sources 16 to provide for an almost infinite variety of illumination effects including, but not limited to, strobe, flashing, modulated, pulsating, and/or other light effects such as a bulls eye or reverse bulls eye lighting signals.

The controller 58 may regulate power to be supplied to the individual LED light sources 16 for exposure to incrementally increased modulated power intensity to provide for a gradual increase in illumination for a light source. The incremental increase in power may continue until maximum power is achieved whereupon a power burst may occur. Modulation of the power intensity for the incremental increase in illumination of all LED light sources 16 within Par 36 LED lamp 10 thereby may provide the appearance of a pulsating or other type of light signal when observed by an individual. The power modulation or light intensity curve is anticipated to resemble a sine wave pattern when the appearance of pulsation for the Par 36 LED lamp 10 is desired. This type of lighting effect may be desirable when used in conjunction with brake lamps for a vehicle.

It should be noted that individual LED light sources 16 within the Par 36 LED lamp 10 are not required to be simultaneously and incrementally illuminated to provide for a desired lighting effect. For example, the circuit board 14 may be separated into one or more distinct segments or areas which are formed of one or more or partial columns 62 and/or rows 64 of LED light sources 16. A particular segment may be selected as a central illumination source which may receive the greatest exposure to the modulated power intensity and therefore, provide the brightest observable light. Adjacent segments disposed around the central illumination segment may be exposed to modulated power of reduced intensity as compared to a central segment. In addition, separated interior segments may be adjacent and positioned outside with respect to the middle segments and, in turn, may receive exposure to a modulated power source of reduced intensity as compared to the middle segments. The number of desired segments may naturally vary at the discretion of an individual. The controller 58 may thereby regulate a power source to provide a modulated power intensity to each individual segment to provide for the appearance of a desired type of lighting effect.

The provision of a modulated power intensity to the individual LED light sources 16 may also be coupled with, or in combination to, the sequential illumination of columns 62 and/or rows 64. In these situations, the light signal may be initially dim whereupon the individual columns 62 and/or rows 64 may then be sequentially incrementally illuminated and/or extinguished for illumination of an adjacent column 62 and/or row 64. The power intensity for the illuminated column 62 or row 64 may simultaneously be incrementally increased for a combination of a unique modulated light signal. In addition, the controller 58 may be programed to provide the appearance of any type of desired lighting effect as preferred by an individual.

The controller 58 preferably is pre-programed for the provision of a constant illumination signal or a flashing, pulsating, strobe, modulated, and/or sequential illumination light signal for the LED light sources 16 during use of the Par 36 LED lamp further providing pulsating, flashing, and/or a variable light effect.

The controller 58 may regulate the power to be supplied to the LED light sources 16 for use in vehicles where a first level of power is provided having lower intensity and a second higher level of power is provided to provide maximum illumination for the light source. In this situation the controller 58 may regulate the provision of low beam and high beam for the par 36 LED lamp 10 during use in dark or nighttime conditions.

It should be noted that the Par 36 LED lamp 10 described herein may be used as a replacement illumination source for a vehicle 22 in substitution of a gaseous discharge lamp and/or halogen illumination source. One use of the Par 36 LED lamp 10 described herein is to replace existing xenon gaseous discharge and incandescent lamps with new LED technology while simultaneously utilizing existing standard bases in an standard lamp enclosure. Light emitted by an incandescent or halogen lamp, in general, contains a full spectrum of visible light wavelengths, most of which are wasted when colored filters are used to provide for a desired colored light effect. The light emitted by an individual LED light source 16 is preferably a narrow wavelength of visible light. The LED light source 16 may be configured to provide for a desired wavelength of visible light to provide a true light output color for the Par 36 LED lamp 10. Individual LED light sources 16 are generally monochromatic and will emit only a single span of electromagnetic wavelength which enables the human eye to visualize red, blue, yellow and/or any other desired color for a light signal. In addition, it should be noted that conventional light sources emit an entire light spectrum and depend upon colored glass or plastic lenses but often become confused by interfering with observation of the light sources. The halogen and incandescent light sources as known generally heat a fragile filament until this filament radiates light, which in turn usually produces large amounts of heat and wasted electrical energy. Conversely, individual light emitting diodes 16 convert an electrical current directly into light, eliminating wasted energy. Light emitting diodes 16 generally consist of a semiconductor crystal chip which, when activated by a relatively low electrical current, emits extremely precise wavelengths of light which may not be obtained through conventional lighting sources such as halogen, incandescent, and gaseous discharge xenon lamps. Individual LED light sources 16 are generally extremely powerful and precise for the provision of a desired wavelength of visible light. The enhanced precision of selection for a wavelength of visible light permits the LED illumination sources 16 to emit pure colors which are visible at greater distances without the dilution of the color which is common with other types of light sources such as incandescent and/or gaseous discharge lamps. In addition, LED light sources 16 also include a relatively wide field of brightness available permitting maximum illumination and in a radius of approximately 140° from the lighting source. The increased field of illumination promotes high visibility for the individual LED light sources 16 which in turn promotes greater safety and enhanced vehicle recognition for a vehicle.

Each of the individual LED light sources 16 is preferably formed of a light emitting diode which may include a shoulder portion 66 and dome 68. The use of light emitting diode (LED's) technology in replacement of traditional halogen, incandescent, or gaseous discharge xenon lamps results in a reduction of heat generation, current draw, and electromagnetic or RF emissions, while increasing lamp life and producing a more true output light color.

The LED light sources 16 may be arranged in an array or pattern for use within the Par 36 LED lamp 10. The array of LED light sources 16 may be formed of the same or different colored light emitting diodes. Generally, each column 62 may consist of a series of different colored LED's. The controller 58 may then be configured to select the color of LED desired to be utilized in forming a unique light signal. Accordingly, the user may select that a blue, red, white, yellow, green, amber, or any combination thereof be used as the color for the desired light signal. Other advantages of the use of LED light sources 16 is the provision of high brightness and sturdy and durable long life for the illumination sources for the Par 36 LED lamp 10. It should be noted that the LED light sources 16 may be configured for the provision of illumination having a desired wavelength corresponding to a preferred color such as blue, red, white, yellow, green, and/or amber. Therefore the necessity for coatings for the LED light sources 16 is eliminated. A truer light output color is thereby provided for observation by an individual.

The LED light sources 16 preferably include electrical contacts 70. The individual LED light sources 16 preferably have a maximum illumination at an angle of incidence of approximately 40° to 45° upwardly from horizontal.

The LED light sources 16 are preferably sturdy and do not fail when exposed to rough operating conditions. It should further be noted that the LED light sources 16 may be easily replaced as required. The LED light sources 16 may also be enclosed within a transparent cover 72 to assist in the prevention of moisture or other contamination which may adversely affect the performance of the LED light sources 16 during use of the Par 36 LED lamp 10. Each individual LED light source 16 preferably provides an energy light output of between 20 and 200 or more lumens as desired by an individual.

The array of LED light sources 16 may be of any size a preferred by an individual. It is anticipated that the array of LED light sources 16 may have a preferred circular or rectangular shape and have an approximate diameter dimension of three inches for use within the Par 36 LED lamp 10. It should be noted, however, that any desired size or shape of LED light sources 16 may be selected by an individual for use in associate with the Par 36 LED lamp 10 as described herein.

Figure 10:
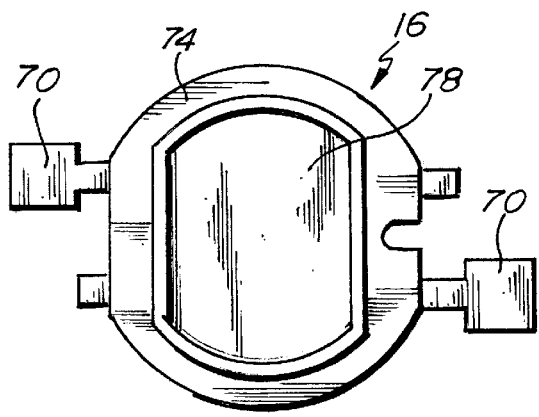
FIG. 10 is a bottom view of an LED light source.
Figure 11:
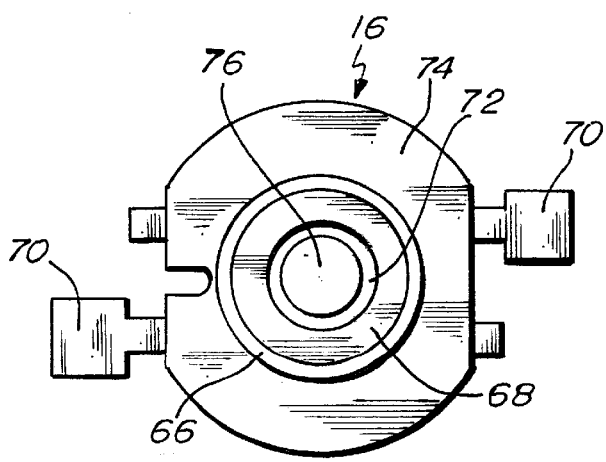
FIG. 11 is a top view of an LED light source.

Referring to FIGS. 10 and 11 the individual LED light sources 16 are illustrated. The LED light sources 16 preferably include a ceramic and/or heat resistant base 74. Centrally within the ceramic and heat resistant base 74 is positioned a light source 76. The light source 76 is preferably enclosed within a protective dome 68. Extending outwardly from the individual light source 16 are a pair of contact paddles 70 which preferably provide for electrical contact with the circuit board 14 for illumination of the light sources 16 during use of the Par 36 LED lamp 10. As may be seen in FIG. 12, the back of the LED light sources 16 preferably include a slug 78. The slug 78 is designed to be positioned within the circular openings or heat sink wells 60 of the circuit board 14. The heat sink wells 60 of the circuit board 14 preferably establish an initial heat sink during use of the Par 36 LED lamp 10. A heat sink is provided to minimize the risk of heat damage caused by the individual LED light sources 16 which may have a sufficient level of power output during use to develop excessive heat. As a result, the slugs 78 as positioned within the heat sink wells 60 are preferably securely affixed to minimize exposure of heat to adjacent components of the Par 36 LED lamp 10 or adjacent components of a vehicle.

The LED light sources 16 may alternatively be angularly offset with respect to the plane of the circuit board 14 as preferred by an individual to provide a maximum illumination at a preferred distance in front of the Par 36 LED lamp 10 during use. In this regard, the angularly offset LED light sources 10 provide maximum illumination along a desired visual line of sight where the Par 36 LED lamp 10 may be used and/or affixed to a front or rear windshield of a vehicle 22 eliminating the provision of light in an upward direction as opposed to a horizontal direction with respect to a vehicle 22. The use of angularly offset LED light sources 16 with respect to the circuit board 14 preferably permits the transmission of the maximum amount of light parallel to a ground surface to enhance visualization by individuals.

The culminator 18 is shown in FIG. 2. The culminator 18 preferably functions to reflect light along a desired visual line of sight as preferred by an individual. The culminator 18 is preferably formed of a cylindrical frame 80 which includes an array of reflector cups 82. The reflector cups 82 preferably pass through the frame 80 and provide openings for surrounding of an LED light source 16. The reflector cups 82 are preferably arranged for positioning proximate to and over the LED lights sources 16 as attached to the circuit board 14 during use of a Par 36 LED lamp 10. It should be noted that the reflector cups 82 are preferably aligned in the identical vertical columns 62 and/or horizontal rows 64 as the LED light sources 16. Each reflector cup 82 preferably includes an angular interior surface 84 which may have a reflector 86 integral thereto.

The reflector cups 82 are preferably conical in shape and are designed to reflect light as emitted from the individual LED light sources 16 during use of the Par 36 LED lamp 10. The culminator 18 and reflector cups 82 may be entirely transparent. Alternatively, the reflector cups 82 may have a clear section 88 and a reflector 86. The clear section 88 may be positioned proximate to the LED light source 16 and the reflector 86 may be positioned proximate to the top of the reflector cups 82.

Alternatively, the reflector 86 may be positioned proximate to the LED light source 16 and the clear section 88 may be positioned proximate to the top of the reflector cup 82. Alternatively, the entire interior surface of the reflector cups 82 may be coated with the reflector 86. It should be noted that any combination of clear sections 88 and reflectors 86 may be utilized within a reflector cup 82 at the discretion of an individual including the provision of a plurality of stripes of reflector 86 within the individual reflector cups 82 as desired by an individual.

The use of a combination of clear sections 88 and reflectors 86 enable an individual to select a desired level of reflection of light. Partial illumination may thereby be provided along an angle of incidence which is not parallel to a desired line of sight. An individual may thereby observe an illuminated light signal from the sides or from the top of the Par 36 LED lamp 10 as opposed to being aligned with a parallel line of sight which occurs upon positioning to the front of a vehicle 22.

The culminator 18 may include one or more apertures which are designed for receiving engagement of the screw 48 used for affixation of the culminator 18 to the circuit board 14 and to the boss section 46 of the body 36.

The lens cover 20 is preferably rounded to assist in providing aerodynamic efficiency for the Par 36 LED lamp 10 during use. The lens cover 20 is preferably positioned over the culminator/reflector 18, LED light sources 16, and circuit board 14 and is preferably secured to the heat sink housing 12 during assembly of the Par 36 LED lamp 10 by the engagement between the screws 48 into the boss sections 46. The front lens cover 20 may be formed of plastic or glass material at the discretion of an individual and preferably includes a cylindrical support ring 90 and a dome shaped protector portion 92. The interface between the front lens cover 20 and the heat sink housing 12 may include the use of a gasket to form a seal to prevent environmental contamination and/or water exposure to the circuit board 14 and LED light sources 16 during use of the Par 36 LED lamp 10. During assembly of the Par 36 LED lamp 10 the interior between the dome shaped protector portion 92 and the culminator 18 may be exposed to a nitrogen gas flush to reduce and/or eliminate water condensation to enhance the performance and efficiency of the Par 36 LED lamp 10.

As may be seen in FIG. 2, the lens cover 20 may include a rearwardly extending support 94 which includes the locking tabs 50 which are used to secure the lens cover 20 to the receiving channel 51 of the heat sink housing 12. The rearwardly extending support 94 may alternatively be a finger for sliding penetrating engagement within the receiving channels 51 to secure the lens cover 20 to the body 36. Alternatively, the lens cover 20 may be affixed to the body 36 through the use of a screw or bolt as preferred by an individual. It should be noted that any other desired affixation mechanism may be used to couple the lens cover 20 to the heat sink housing 12 as preferred by an individual including, but not limited to, threaded couplers.

It should be noted that the lens cover 20 is preferably adapted to be releasably secured to the heat sink housing 12 to enable an individual to replace the lens cover 20, the LED light sources 16, culminator 18, and/or circuit board 14 as required. The interface between the lens cover 20 and the heat sink housing 12 is preferably impervious to moisture penetration and/or environmental contamination to maximize the efficiency and performance of the circuit board 14, LED light sources 16 and culminator 18 during use of the Par 36 LED lamp 10.

Figure 3:
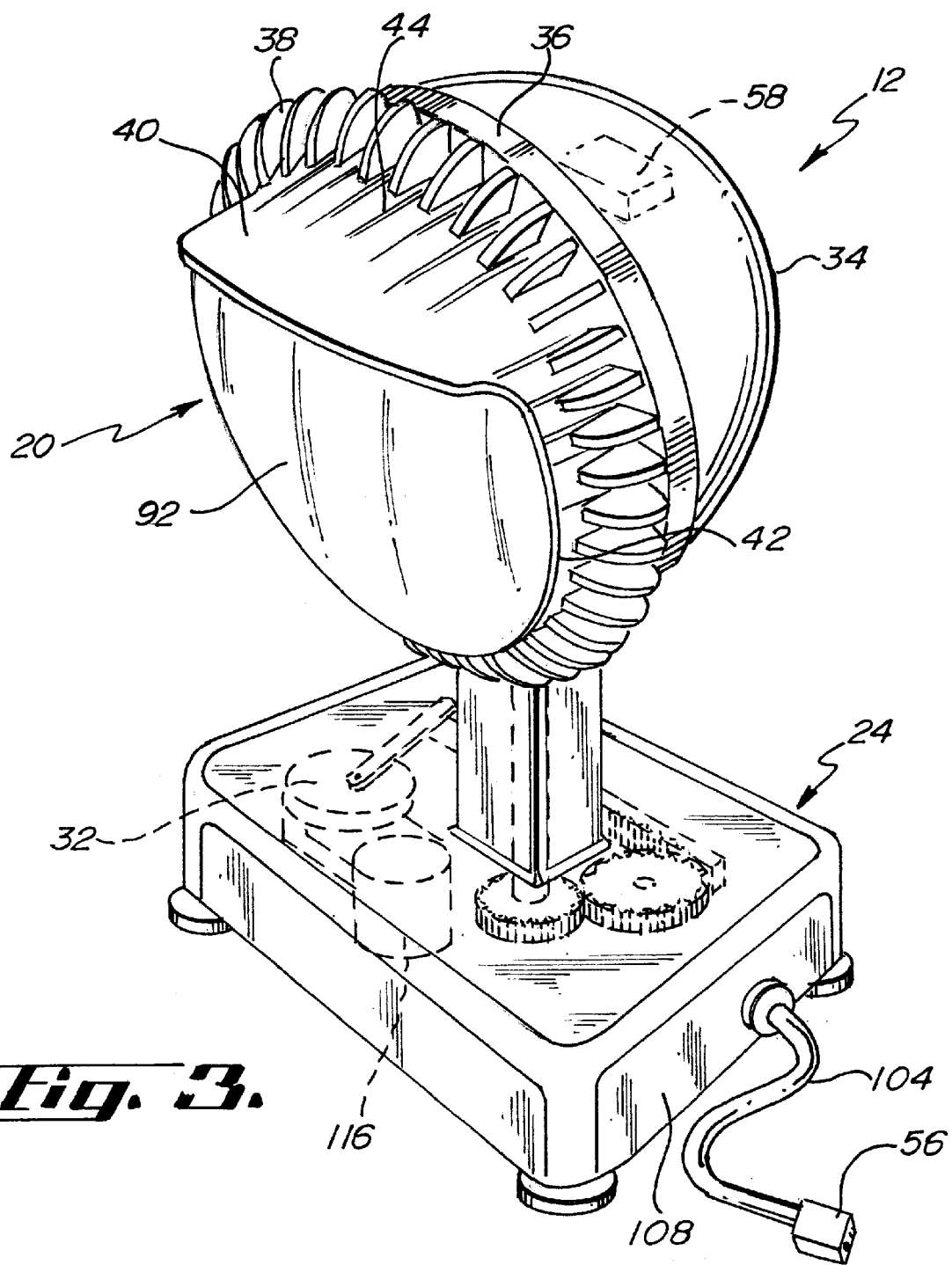
FIG. 3 is an environmental view of the Par 36 LED Lamp connected to a base.

As depicted in FIG. 3 the Par 36 LED lamp 10 may be affixed to a gyrator 32 as mounted to a base 24. The gyrator 32 may be used to impart motion to the Par 36 LED lamp 10 at the preference of an individual. This rotation may include oscillating, revolving, and/or any other type of rotation as desired by an individual. The gyrator 32 generally includes electric motors and gears 116. The gyrator 32 is preferably configured to receive the plug in adaptor 56 of the Par 36 LED lamp 10. Power cable 104 may then be connected to a power supply for rotation and/or oscillation of the Par 36 LED lamp 10 during use.

The gyrator 32 may be capable of rotating or oscillating the Par 36 LED lamp 10 about single or dual axis of rotation. The gyrator 32 may be configured to rotate or oscillate the Par 36 LED lamp 10 about a vertical axis and further oscillate the Par 36 LED lamp 10 about a horizontal axis through the use of separate motors. Oscillation of the Par 36 LED lamp 10 about a horizontal or vertical axis may be accomplished by attachment of a swivel arm to a bracket and/or a post which is mounted to a motor. Alternative methods of imparting rotational and/or oscillation motion to the Par 36 LED lamp 10 may be provided through the use of electric motors, tooth gears, and worm gears. In addition, the gyrator 32 may provide revolving or oscillating motion to the Par 36 LED lamp 10 through the use of electrical brushes or other rotational means without sacrificing the operation of the Par 36 LED lamp 10.

It should be noted that the Par 36 LED lamp 10 may be used in association with an automobile as a headlight, accessory light, rear or front bumper light, and/or spotlight; a motorcycle as a headlamp; a snowmobile as a headlamp; a personal watercraft, boat, truck, fire vehicle, helicopter, and/or any other type of vehicle receptive to the use of utility signal lights. It should further be noted that the heat sink housing 12 may be releasably mounted to the interior top front dashboard or rear dashboard of a vehicle 22. The mounting of the Par 36 LED lamp 10 to either the front or rear dashboards may minimize the necessity for inclusion of angular offsets for the LED light sources 16. It should be further noted that the Par 36 LED lamp 10 may be releasably affixed to the interior of the front or rear windshields via the use of suction cups, brackets, hook-and-loop fabric material such as Velcro®, and/or any other releasable affixation mechanism at the preference of an individual. An individual may then adjust and reposition the location of the Par 36 LED lamp 10 within the interior of a vehicle 22 as desired.

Alternatively the Par 36 LED lamp 10 may function as a remote, revolving, or stationary beacon. In this embodiment, the heat sink housing 12 may be releasably connected to a transportable support via the use of a bracket. The transportable support may be a tripod having telescoping legs or may be any other type of support as preferred by an individual. In this embodiment, the heat sink housing 12 is electrically connected to an elongate extension cable 104 which may include any desired adaptor for electrical communication with an electrical power supply. The remote transportable support may also include plug-in adaptors for electrical communication with another Par 36 LED lamp 10 as preferred by an individual.

The transportable support may also include the gyrator 32 to provide a desired rotational motion for the Par 36 LED lamp 10. A controller 58 having a microprocessor may also be integral to or in electrical communication with the LED light sources 16 of the transportable support for the provision of multi-colored lights, flashing, pulsating, modulated, and/or strobe illumination effects as desired by an individual. The Par 36 LED lamp 10 may be physically separated from a vehicle 22 any desired distance to facilitate or enhance illumination of an environment. In addition, it should be noted that a series of remote Par 36 LED lamps 10 may be electrically coupled to each other for any desired distance to again facilitate illumination of an environmental condition.

The Par 36 LED lamp 10 may be used in a variety of locations about a vehicle 22. It should be noted that the use of the Par 36 LED lamp 10 is not necessarily limited to positioning adjacent to a headlamp, headlight, taillight, or tail lamp of a vehicle 22. The Par 36 LED lamp 10 may be used as a rotational or oscillating reflector light within the interior adjacent to a front, rear, and/or side window of a vehicle 22. In addition it should be noted that a plurality of Par 36 LED lamps 10 may be used outside of a vehicle 22 adjacent to an airline runway or used as other lights.

It is also envisioned that the controller 58 may regulate the Par 36 LED lamp 10 independently from another Par 36 LED lamp 10. Independent and distinct light signals may thereby be provided as compared to signals produced by other light sources within a vehicle 22. Different colors or different types of light effects may therefore be provided from a vehicle 22 for observation by individuals. In addition, it should be noted that the controller 58 may alternate the type of signal to be provided by the Par 36 LED lamp 10. For example, the Par 36 LED lamp 10 may flash alternating colors of red, amber, blue, and white at the discretion of an individual. Alternatively, the controllers 58 of a plurality of Par 36 LED lamps 10 may be coupled for the provision of a desired uniform or alternating lighting effect. For example, the coupling of individual controllers 58 together may provide the opportunity for production of a flashing, or strobe light effect which may be particularly useful in certain situations.

It should also be noted that the Par 36 LED lamp 10 may be incorporated into an emergency vehicle light bar 130 which generally extends from the driver's side to passenger's side of an emergency vehicle 22. A cover 112 generally protects the light bar 130 from environmental contamination and exposure to moisture. Each side of light bar 130 may have a Par 36 LED lamp 10 to produce light signals on each side of the emergency vehicle 22. Furthermore, controller 58 may be used to create multiple light signals on each side of light bar 130. For example, a controller 58 may create a blue light source positioned on the front passenger side of light bar 130, pulsating white lights positioned at a front driver's side of light bar 130 and yellow lights therebetween. Additional light signals may be provided on the rear side of light bar 130 at the discretion of an individual.

The Par 36 LED lamp 10 may be used as a take-down light for an emergency vehicle 22. Alternatively, the Par 36 LED lamp 10 may be used as alley light for as emergency vehicle 22.

During the use of the Par 36 LED lamp 10 as a take-down light a plurality of lamps 10 may be integral to a light bar 130. Adjacent Par 36 LED lamps 10 may alternate in positioning between forwardly facing and rearwardly facing along the length of the light bar 130 to provide for illumination forwardly and/or rearwardly to as emergency vehicle 22. The use of a Par 36 LED lamp 10 as a take-down light may necessitate that the LED light sources 16 be angularly offset with respect to the circuit board 14 to provide illumination along a preferred line of sight.

The use of the Par 36 LED lamp 10 as a take-down light improves illumination of areas in front of an emergency vehicle 22 by flooding a stopped vehicle with light while simultaneously hiding the actions and locations of law enforcement personnel during law enforcement activities. In addition, the illumination provided by the Par 36 LED lamp 10 may also assist in enhancing the visibility of an emergency vehicle 22 during dark illumination conditions which in turn improves the safety for law enforcement personnel.

The Par 36 LED lamp 10 is preferably coupled to a power supply, battery, or other low voltage power supply for a vehicle. Alternatively, the Par 36 LED lamp 10 may be connected to an internal controller 58 which may be a rotatable dial to assist in regulating the brightness of the Par 36 LED lamp 10 during use. Alternatively, the controller 58 may be coupled to a photosensitive or photo-electric detector to assist in the selection of a desired level of light output for the Par 36 LED lamp 10 dependent upon the environmental conditions encountered by law enforcement personnel during use of a take-down light.

It should also be noted that the Par 36 LED lamp 10 when used as a take-down light may provide for alternating colored light signals to be emitted from the light bar 130 during use on as emergency vehicle 22. In this situation the individual Par 36 LED lamps 10 may be controlled independently from one another to provide for a desired composite lighting effect for as emergency vehicle 22. The Par 36 LED lamp 10 may be used as a take-down light or the par 36 LED lamp 10 may be used in conjunction with motorcycles, snowmobiles, personal watercraft, boats, trucks, fire vehicles, ambulances, and/or helicopters or as stationary beacons at airports at the preference of as individual.

Alternatively, the Par 36 LED lamp 10 may be used as an alley light which is almost identical in construction and functionality to the take-down light. An alley light is predominately used for the provision of illumination to areas adjacent to the sides of a vehicle 22. In this regard the alley light is preferably adapted for provision of illumination perpendicular to the longitudinal axis of a vehicle 22. In this embodiment the Par 36 LED lamp 10 may be mounted to a mechanical pivot or rotational device which may include an electric motor. The Par 36 LED lamp 10 when used as an alley light may be integral with, or affixed to, a light bar 130 of a vehicle 22. The mechanical pivot or rotational device may include electric motors which may alternatively be rotated manually at the preference of as individual. The rotation of the mechanical pivot permits fixed angular illumination of areas adjacent to a vehicle 22 which are not perpendicular to either a drivers or passengers sides. In this regard, the Par 36 LED lamp 10 may be used as an a spot light which may be manipulated forwardly, rearwardly, upwardly, and/or downwardly to provide illumination of a desired area relative to a vehicle 22. Alternatively, the Par 36 LED lamp 10 may be integral to, or removable from, the light bar 130 at the preference of as individual. As such, the Par 36 LED lamp 10 may be releasably secured to the ends of the light bar 130 through the use of fasteners such as an bolts and nuts, screws, adhesives, and/or Velcro®. It should also be noted that an individual may simultaneously illuminate the Par 36 LED lamp 10 functioning as an take-down lights and the Par 36 LED lamp 10 functioning as an alley lights independently from one another. It should also be noted that the Par 36 LED lamp 10 when used as an alley light is preferably affixed to opposite ends of the light bar 130 and is generally positioned perpendicular to the longitudinal axis for a vehicle 22.

The Par 36 LED lamp 10 may also include a plug-in adaptor or connector 56 which preferably interfaces for coupling engagement to a cigarette lighter of a motor vehicle 22. Low voltage power output is thereby available for the Par 36 LED lamp 10. Alternatively, the Par 36 LED lamp 10 may include a power cord which resembles a power cord for a cellular telephone or any other type of power cord as an desired by as individual. Further, the Par 36 LED lamp 10 may be powered through the use of batteries at the discretion of as individual.

The Par 36 LED lamp 10 may also be used as aircraft landing lights, runway lights, construction lights, grill lights, rotational lights, bumper lights, rear deck flashing lights, helicopter lights, and remote beacons at the preference of as individual.

The Par 36 LED lamp 10 may also be electrically and mechanically connected to an electric motor to provide for mechanical rotation of the Par 36 LED lamp 10. The electric motor engaged to the Par 36 LED lamp 10 may be permanently affixed or releasably secured to a structure such as an a rear deck of a vehicle 22 or to a post via the use of hook and loop fabric material, adhesives, brackets including nuts and bolts, and/or screws or any other affixation mechanism as an preferred by as individual. It should be noted that the Par 36 LED lamp 10 may be permanently electrically coupled to a power source or releasably connected thereto via the use of plug-in connectors 56 which may include adaptors for use with a vehicle cigarette lighter.

Alternatively, the Par 36 LED lamp 10 may be used as an intersection clearing light. The use of the Par 36 LED lamp 10 as an intersection clearing light preferably includes the components as an earlier described for use as an alley light. The use of the Par 36 LED lamp 10 as an intersection clearing light preferably requires the mounting of the Par 36 LED lamp 10 to an electric motor which is positioned proximate to opposite ends of the light bar 130. The Par 36 LED lamp 10 being used as an intersection clearing light is preferably adapted to easily replace existing illumination devices utilizing an identical electrical motor for oscillation and/or rotation of incandescent, gaseous discharge xenon lamps, or halogen light sources. In general, during use of the Par 36 LED lamp 10 as an intersection clearing light, an electric motor may oscillate the heat sink housing 12 at an angle of approximately 45° forwardly and 45° rearwardly relative to a perpendicular axis extending outwardly from a vehicle 22. The Par 36 LED lamp 10 thereby functions to communicate to traffic entering or exiting an intersection as to the presence of an emergency vehicle 22 within an intersection. The Par 36 LED lamp 10 used as an intersection clearing light preferably improves the safety to traffic and emergency personnel within the intersection during an emergency situation. The Par 36 LED lamp 10 may also include gears and/or rocker arms which may be used to provide vertical oscillation as well as horizontal motion to the heat sink housing 12 at the discretion of as individual.

Figure 8:
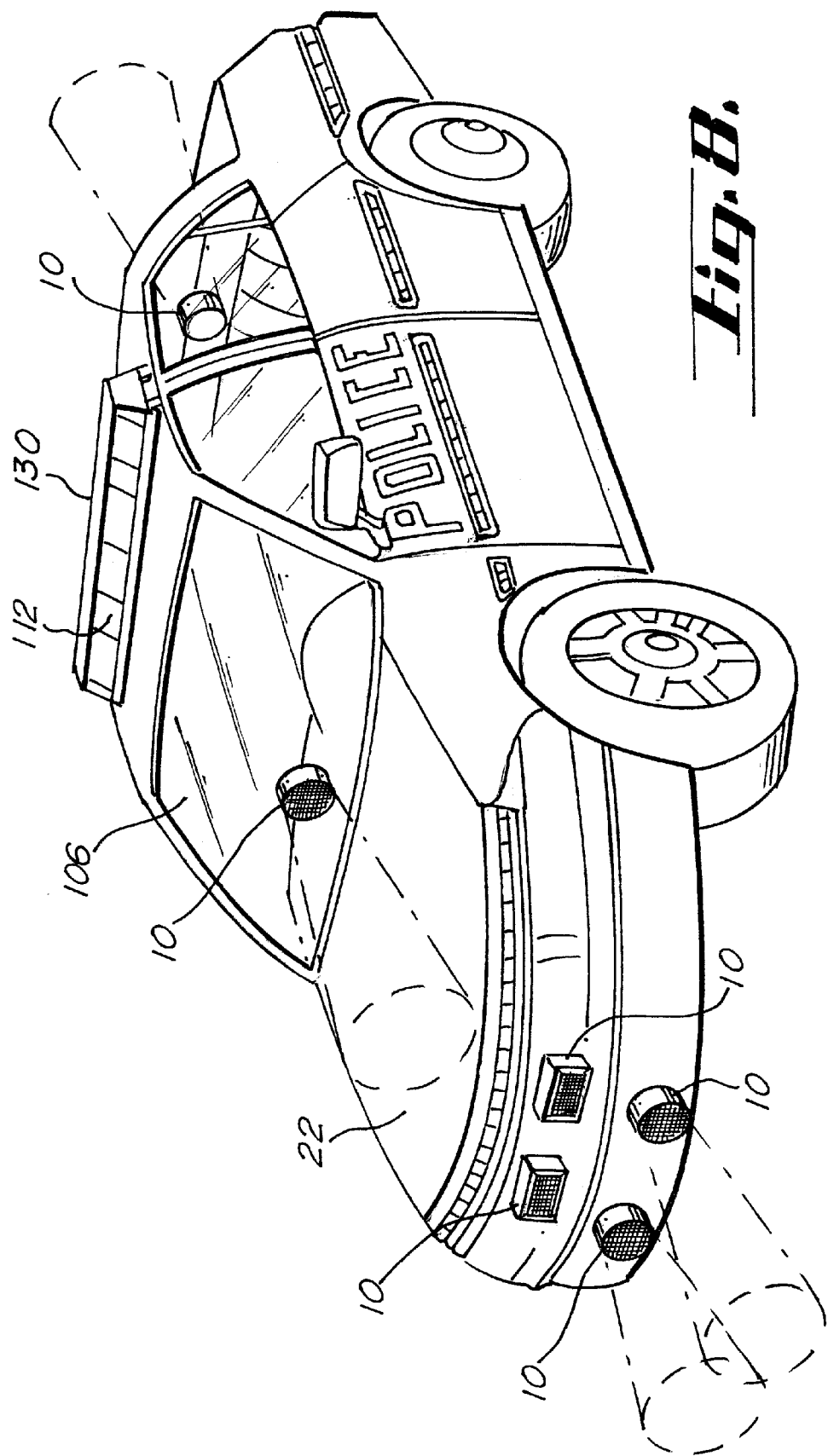
FIG. 8 is an environmental view of an emergency vehicle.
Figure 9:
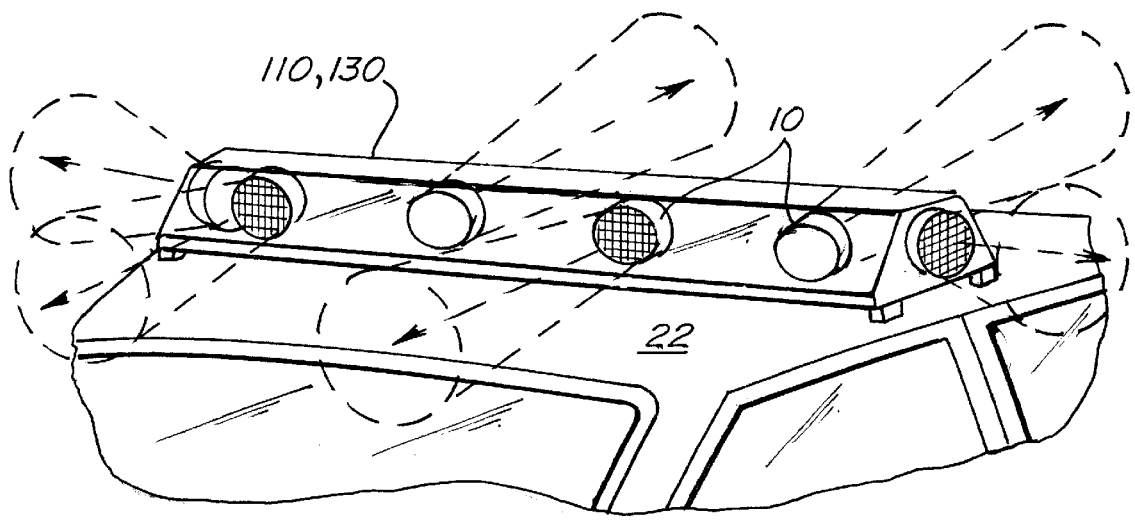
FIG. 9 is detail view of a light bar of an emergency vehicle.

In an alternative embodiment as depicted in FIG. 12, an LED utility lamp 10 is depicted. In this embodiment, the LED utility lamp 10 is generally rectangular and/or square in shape and is adapted to be secured at any location about a vehicle. As depicted in FIG. 8, the LED utility lamp 10 may be affixed proximate to the front grill and/or rear bumper of a vehicle 22. The LED utility lamp 10 preferably includes a housing 12, circuit board 14, individual LED light sources 16, culminator 18, and a lens cover 20 as earlier described. The main difference between the embodiment as depicted in FIG. 12 and the earlier embodiment described is the shape of the housing 12 and lens cover 20. In the embodiment as depicted in FIG. 12 the housing 12 includes a rear panel 118 in substitution for the rear dome 34. The rear panel 118 is preferably flat and functions as a heat shield and as a mounting surface for one or more affixation brackets 120 which are preferably used to secure the LED utility lamp 10 to a vehicle proximate to the front bumper or to the rear bumper. Any desired type of affixation means may be used to attach the affixation brackets 120 to a vehicle including but not limited to the use of bolts and nuts, screws, pins, welds, and/or fasteners. The affixation brackets 120 may include clips, apertures, and/or key holes 122 which may assist in the attachment of the utility LED lamp 10 to a vehicle 22. Alternatively, the LED utility lamp 10 may be positioned at any other desired location within the interior or to the exterior of an emergency vehicle as preferred by an individual. It should be noted that the LED utility lamp 10 may be permanently or releasably secured to a vehicle 22 at the preference of an individual. affixation brackets 120 which are preferably used to secure the LED utility lamp 10 to a vehicle proximate to the front bumper or to the rear bumper. Any desired type of affixation means may be used to attach the affixation brackets 130 to a vehicle including but not limited to the use of bolts and nuts, screws, pins, welds, and/or fasteners. The affixation brackets 120 may include clips, apertures, and/or key holes 122 which may assist in the attachment of the utility LED lamp 10 to a vehicle 22. Alternatively, the LED utility lamp 10 may be positioned at any other desired location within the interior or to the exterior of an emergency vehicle as preferred by an individual. It should be noted that the LED utility lamp 10 may be permanently or releasably secured to a vehicle 22 at the preference of an individual.

It should also be noted that the LED utility lamp 10 may be rotated through the use of a gyrator as earlier described. The LED utility lamp 10 as depicted in FIG. 12 preferably includes the identical features and functions as the Par 36 LED lamp 10 as earlier described with the exception of the shape of the front lens cover 20 and rear panel 118. The LED utility lamp 10 also preferably includes a controller 58 used to selectively illuminate individual or a plurality of LED's 16, or a plurality of types or patterns of LED's 16, to provide a variety of unique light effects as earlier described. These lighting effects include but are not necessarily limited to strobe, pulsating, flashing, rotational, oscillating, modulated, and/or any other lighting effect as preferred by an individual.

The housing 12 is preferably formed of a one piece frame. The lens cover 20 preferably is secured to the housing 12 to form a weather proof seal therebetween. The rear panel 118 may be integral or releasably attached to the housing 12 by any preferred means including, but not limited to, the use of affixation members 114. It should be noted that the interior of the housing 12 may include a plurality of positioning ledges and/or bore sections 46 which are used to secure the circuit board 14, LED light sources 16, and culminator 18 in a desired position within the interior of the housing 12. Access to the circuit board 14, culminator 18, or LED light sources 16 may then occur by either removal of the rear panel 118 or withdrawal of the lens cover 20. Repair to or replacement of the LED light sources 16, culminator 18, and/or circuit board 14 may thereby occur as necessary during maintenance of the utility LED lamp 10.

The present invention may be embodied in other specific forms without departing from the spirit or essential attributes thereof; and it is, therefore, desired that the present embodiment be considered in all respects as an illustrative and not restrictive, reference being made to the appended claims rather than to the foregoing description to indicate the scope of the invention.

What is claimed is:

1. A Par 36 LED lamp comprising:
   (a) a housing;
   (b) a circuit board connected to said housing, said circuit board having a plurality of LED receiving apertures and a plurality of LED light sources, one of said LED light sources being disposed in each of said LED receiving apertures, said LED light sources being in electrical communication with said circuit board, said circuit board being in electrical communication with a power supply;
   (c) a controller in communication with said circuit board, said controller being constructed and arranged to control illumination of at least one of said LED light sources;
   (d) a culminator disposed over said LED light sources, said culminator being positioned adjacent to said circuit board, said culminator having a cylindrical frame having a plurality of reflector cups passing through said frame, each of said reflector cups having an angular interior surface having a reflector partially covering said angular interior surface, each of said LED light sources being positioned adjacent to one of said reflector cups; and
   (e) a lens cover connected to said housing for enclosing said circuit board, and said light sources.

2. The Par 36 LED lamp according to clam 1, wherein said reflector cups are arranged in a pattern of horizontal rows and vertical columns.

3. The Par 36 LED lamp according to claim 1, said lens cover comprising a cylindrical support ring and a dome protector integral to said cylindrical support ring.

4. The Par 36 LED lamp according to claim 1, said housing comprising:
   (a) a heat sink base;
   (b) a frame extending from said heat sink base;
   (c) a plurality of supports integral to said frame; and
   (d) a visor extending from said frame.

5. The Par 36 LED lamp according to claim 1, wherein said circuit board is positioned proximate to said frame.

6. The Par 36 LED lamp according to claim 1, wherein said housing is affixed to a tripod.

7. The Par 36 LED lamp according to claim 1, wherein said housing is affixed to a vehicle.

8. The Par 36 LED lamp according to claim 1, wherein said housing is affixed to a gyrator for use as an intersection clearing light.

9. The Par 36 LED lamp according to claim 1, wherein the housing is affixed to a vehicle for use as an alley light.

10. The Par 36 LED lamp according to claim 1, wherein the housing is affixed to a vehicle for use as a take-down light.

11. A Par 36 lamp comprising:
    (a) a housing having a heat sink base, a frame extending from said heat sink base, a plurality of supports integral to said frame; and a visor extending from said frame;
    (b) a circuit board connected to said housing, said circuit board having a plurality of LED receiving apertures, said circuit board constructed and arranged to be in electrical communication with a power supply;
    (c) a plurality of LED light sources, each of said LED light sources being disposed in each of said LED receiving apertures, each of said LED light sources being in electrical communication with said circuit board;
    (d) a culminator, said culminator being disposed over said plurality of LED light sources, said culminator being positioned adjacent to said circuit board, said culminator having a cylindrical frame having a plurality of reflector cups arranged in a pattern of horizontal rows and vertical columns, the plurality of reflector cups passing through said cylindrical frame wherein each one of said LED light sources is positioned adjacent to one of said reflector cups, each of said reflector cups having an angular interior surface having a reflector completely covering the angular interior surface;
    (e) a lens cover comprising a cylindrical support ring and a dome protector integral to said cylindrical support ring, said lens cover connected to said housing for enclosing said circuit board and said light sources; and
    (f) a controller in communication with said circuit board for illumination of said LED light sources.

12. The Par 36 LED lamp according to claim 11, wherein said circuit board is positioned proximate to said cylindrical frame.

13. The Par 36 LED lamp according to claim 12, wherein said housing is affixed to a tripod.

14. The Par 36 LED lamp according to claim 12, wherein said housing is affixed to a vehicle.

15. The Par 36 LED lamp according to claim 12, wherein said housing is affixed to a gyrator for use as an intersection clearing light.

16. The Par 36 LED lamp according to claim 12, wherein the housing is affixed to a vehicle for use as an alley light.

17. The Par 36 LED lamp according to claim 12, wherein the housing is affixed to a vehicle for use as a take-down light.

18. A Par 36 lamp comprising:
   (a) a housing, the housing having a heat sink base, a frame extending from the heat sink base, and plurality of supports integral to the frame;
   (b) a circuit board connected to the housing, the circuit board having a plurality of LED receiving apertures, said circuit board constructed and arranged to be in electrical communication with a power supply;
   (c) a plurality of LED light sources, each of the LED light sources being disposed in one of the LED receiving apertures, each of the LED light sources being in electrical communication with the circuit board;
   (d) a culminator, the culminator being disposed over the plurality of LED light sources, the culminator being positioned adjacent to the circuit board, the culminator having a cylindrical frame having a plurality of reflector cups arranged thereon, the plurality of reflector cups passing through the cylindrical frame wherein each one of the LED light sources is positioned adjacent to one of the reflector cups, each of the reflector cups having an angular interior surface, the angular interior surface being at least partially reflective;
   (e) a lens cover comprising a cylindrical support ring and a dome protector integral to the cylindrical support ring, the lens cover connected to the housing for enclosing the circuit board and the LED light sources; and
   (f) a controller in communication with the circuit board for illumination of the LED light sources.

19. The Par 36 LED lamp according to claim 18, wherein said reflector completely covers said angular interior surface.

* * * * *